(12) United States Patent
Meyer

(10) Patent No.: US 11,249,480 B2
(45) Date of Patent: Feb. 15, 2022

(54) AUTONOMOUS VEHICLE POSITIONING SYSTEM

(71) Applicant: TOYOTA MOTOR NORTH AMERICA, INC., Plano, TX (US)

(72) Inventor: Scott R. Meyer, Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 180 days.

(21) Appl. No.: 16/536,231

(22) Filed: Aug. 8, 2019

(65) Prior Publication Data

US 2021/0041869 A1  Feb. 11, 2021

(51) Int. Cl.
| | |
|---|---|
| G05D 1/00 | (2006.01) |
| G08G 1/01 | (2006.01) |
| G05D 1/02 | (2020.01) |
| G08G 1/09 | (2006.01) |

(52) U.S. Cl.
CPC ......... *G05D 1/0088* (2013.01); *G05D 1/0061* (2013.01); *G05D 1/0278* (2013.01); *G05D 1/0287* (2013.01); *G08G 1/0108* (2013.01); *G08G 1/0129* (2013.01); *G08G 1/09* (2013.01); *G05D 2201/0213* (2013.01)

(58) Field of Classification Search
CPC .. G05D 1/0088; G05D 1/0061; G05D 1/0278; G05D 1/0287; G05D 2201/0213; G08G 1/0108; G08G 1/0129; G08G 1/09

USPC .......................................................... 701/24
See application file for complete search history.

(56) References Cited

U.S. PATENT DOCUMENTS

| | | |
|---|---|---|
| 2018/0322782 A1 | 11/2018 | Engel |
| 2018/0342156 A1* | 11/2018 | Martin ................. G08G 1/0145 |
| 2019/0051159 A1 | 2/2019 | Wang |
| 2019/0066409 A1 | 2/2019 | Moreira Da Mota |
| 2019/0079659 A1 | 3/2019 | Adenwala |
| 2019/0163181 A1* | 5/2019 | Liu ....................... G05D 1/0212 |

\* cited by examiner

*Primary Examiner* — Gertrude Arthur Jeanglaude
(74) *Attorney, Agent, or Firm* — Sheppard, Mullin, Richter & Hampton LLP; Hector A. Agdeppa; Daniel N. Yannuzzi

(57) ABSTRACT

Systems and methods are provided to determine traffic configuration parameters, such as location and speed, that are correlated with optimal traffic flow specific to particular road regions. In a specific embodiment, the disclosure is directed to a vehicle positioning system which utilizes a multi-client server application model configured to perform predictive analysis based upon data collected from a plurality of data streams, infrastructure elements, and vehicles. In a particular implementation, roadways may be partitioned into road regions which may be associated with vehicle configuration templates. Vehicle configuration templates may define instructions for automated vehicle driving parameters within a particular road region. In a specific embodiment, the vehicle positioning system may invoke transition sequences based upon real-time traffic data to modify a given traffic configuration.

19 Claims, 10 Drawing Sheets

AUTONOMOUS VEHICLE POSITIONING SYSTEM

TECHNICAL FIELD

The present disclosure relates generally, to systems and methods for positioning automated vehicles, and in particular, some implementations may relate to the control of automated vehicle driving configuration based on communicated or received input.

DESCRIPTION OF RELATED ART

Autonomous vehicle (AV) and semi-autonomous vehicle (SAV) systems exist for controlling the driving behaviors of a vehicle. Current AV and SAV systems use vehicle control systems to interpret sensory information, to identify appropriate traffic configurations, to decide navigation paths, and to actuate vehicle systems. Many AV and SAV systems are directed systems that minimize vehicle collisions. However, the complexity of AV and SAV systems significantly increase in complexity when designed for long-term traffic flow management. There are no solutions for coordinating the configuration of an entire highway of vehicles.

BRIEF SUMMARY OF THE DISCLOSURE

According to various embodiments of the disclosed technology is disclosed a system for configuring a plurality of vehicles comprising a computing device configured to communicate with a plurality of vehicles over a network. In embodiments, the computing device may comprise a processor, a non-transitory machine-readable storage medium comprising computer-readable instructions that, when executable by the processor, perform the various steps recited herein.

In implementations, the system may be configured to retrieve a vehicle configuration template, wherein the vehicle configuration template may comprise a set of instructions corresponding to desired vehicle dynamics and position of each of a plurality of vehicles within a first road region. The system may be configured to implement a vehicle transition sequence based on the vehicle configuration template, wherein a vehicle transition sequence may comprise autonomously or semi-autonomously operating one or more of the vehicles to adjust their respective current positional or dynamic parameters to conform to the desired vehicle dynamics and position specified in the vehicle configuration template. In embodiments, the a road region may comprise a road configuration pertaining to the number of lanes in a road region, the type of lane, and the geometry of the road.

According to various embodiments described herein, the vehicle configuration template may comprise a first set of parameters pertaining to a first lane, wherein the first set of configuration parameters comprises one or more of: a maximum speed; a maximum number of vehicles within the first defined road region; and a clearance distance between vehicles within the first defined road region.

In other embodiments, the vehicle configuration template may further comprise a second set of configuration parameters pertaining to a second lane, wherein one or more of the second set of configuration parameters are different from the first set of configuration parameters.

In implementations of the disclosure, the plurality of vehicles may be configured to communicate to the system one or more of a vehicle position, vehicle dynamics information, and a destination, wherein achieving a destination from a given location may require one or more driving maneuvers determined by various known GPS and routing technologies. The vehicle configuration template may be based on the destination of one or more vehicles within the first road region. In embodiments of the invention, vehicle configuration template may be dependent on the time of day.

In implementations, the first road region may comprise two boundaries approximately perpendicular to the flow of traffic within the first road region, wherein the boundaries may be virtual geographic boundaries defined by one or more GPS coordinates.

In implementations, determining a current traffic configuration within a first defined road region may comprise: receiving vehicle position and vehicle dynamic information from vehicles at a first boundary of the road region; receiving vehicle position and vehicle dynamic information from vehicles at a second boundary of the road region; and determining a traffic configuration based on one or more of the difference between the vehicle position and vehicle dynamic information received at the second boundary and the first boundary, the time it takes for a vehicle to traverse the road region, and the number of vehicles that traverse the road region in a period of time; one or more detected lane changes that occurred within the road region.

In implementations, the system may be configured to generate a traffic configuration modification, wherein a traffic configuration modification may comprise a change in vehicle position or vehicle dynamics for one or more vehicles. The system may be further configured to queue one or more traffic configuration modifications and implement a vehicle transition sequence to satisfy the traffic configuration modification at periodic intervals until there are no outstanding queued traffic configuration modifications. In embodiments, a traffic configuration modification may be generated for vehicles traveling from the first road region in the direction of a second road region, when the road configuration of the first road region is different from a second road region. A traffic configuration modification may be generated upon the receipt of a vehicle maneuver request from a vehicle and a vehicle maneuver request may be received by a vehicle based on the vehicle's destination.

In implementations, a vehicle configuration template may be generated by: monitoring traffic flow pertaining to the first road region; implementing a mathematical model to correlate monitored vehicle position and vehicle dynamics to traffic flow; determining one or more vehicle configuration parameters based on the monitored traffic flow; and generating a vehicle configuration template based on the determined vehicle configuration parameters.

Herein is also disclosed a method of generating vehicle configuration templates, comprising collecting traffic flow data, determining traffic flow parameters based on the collected traffic flow data, determining one or more vehicle configuration parameters based on correlations between determined positional or dynamic parameters and optimal determined traffic flow parameters; and generating a vehicle configuration template based on determined vehicle configuration parameters. In implementations, traffic flow parameters may comprise one or more of a flow rate or a traffic density and may be associated with a defined road region. In implementations, a positional parameter may relate to one or more of a vehicle location, a lane in which the vehicle is traveling, or clearing distance between vehicles and a dynamic parameter may relate to one or more of a vehicle speed, an acceleration, or a vehicle operation.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
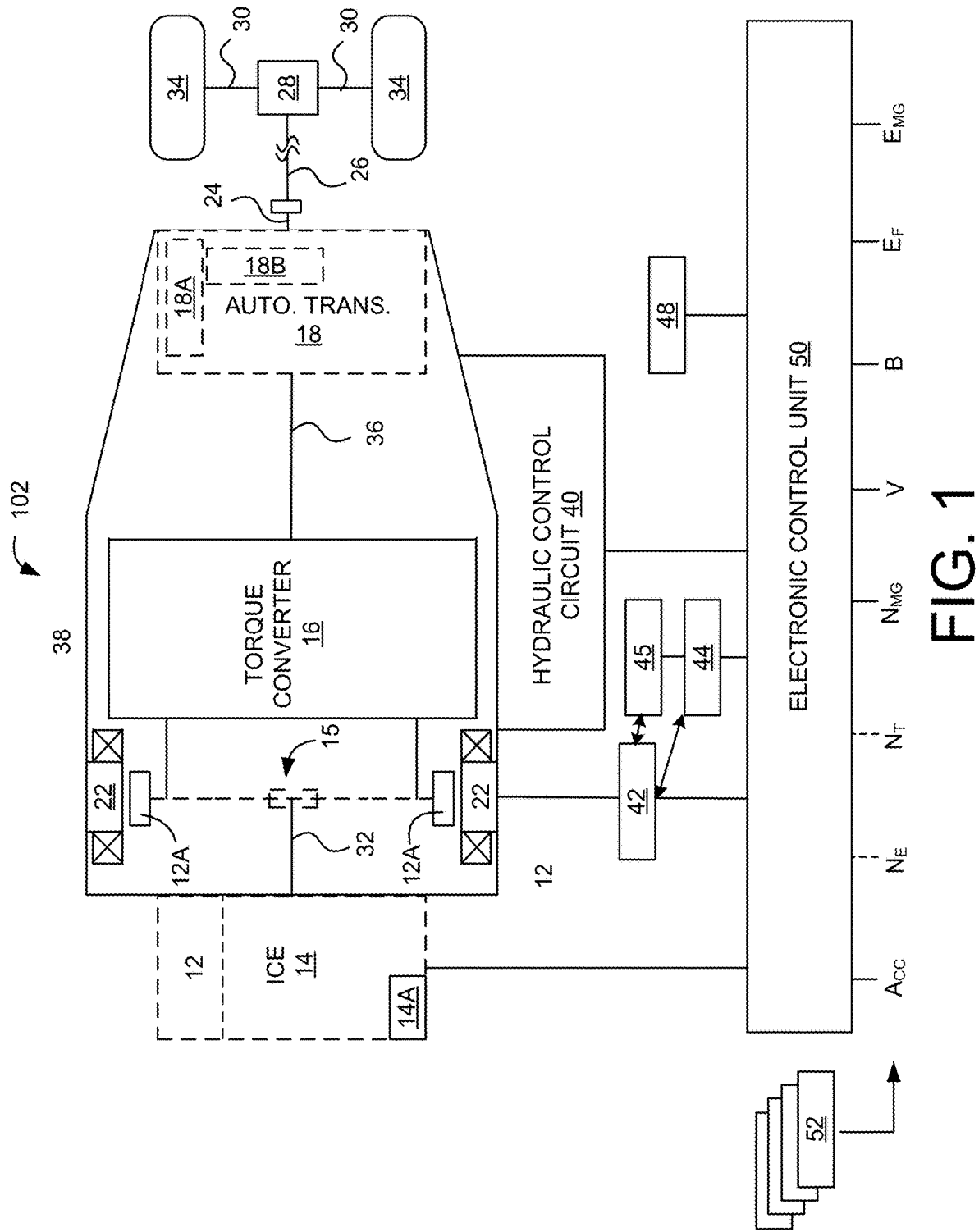
FIG. 1 illustrates an example vehicle in accordance with the embodiments described herein.

The figures are not exhaustive and do not limit the present disclosure to the precise form disclosed.

DETAILED DESCRIPTION

The present disclosure solves the problem of AV and SAV long-term traffic flow management by partitioning roadways into road regions, generating optimal traffic configuration templates based upon historical data, and updating the optimal traffic configuration parameters associated with the traffic configuration templates based upon traffic analysis to maximize traffic flow and minimize collision events.

The present disclosure relates generally to automated vehicle positioning systems designed to increase traffic flow efficiency and safety. The systems and methods described herein may analyze traffic flow behavior pertaining to sections of road to determine the positional and dynamic behavior of vehicles that is correlated with optimal levels of traffic flow. Using determined optimal positional and dynamic parameters, traffic configuration templates may be generated establishing vehicle location and speed. Traffic configuration templates may comprise instructions communicated to a fleet of connected autonomous vehicle so that the vehicles may organize themselves according to generated templates. The implementations described herein may yield traffic efficiencies and safety advantages by increasing cooperation and organization between a network of autonomous vehicles.

Various embodiments of the present disclosure provide a mechanism for automatically implementing the position, configuration, vehicle dynamics, and/or the operating parameters of a vehicle, or a fleet of vehicles, relative to other vehicles in order to increase traffic flow efficiency and safety. In some embodiments, the position and speed of an automated vehicle (AV) may be controlled based on traffic configuration templates that have been trained using traffic flow data collected from particular road regions.

Crowd sourced data such as V2X data, including driver and vehicle data, may be collected and evaluated to determine traffic flow and driving characteristics within a road regions. A road region may comprise any path, boundary, line, or area on a roadway associated with a particular traffic configuration template. It should be noted that road regions can refer to characteristically different portions of a particular roadway or section(s) of roadway, e.g., a lane, an exit ramp, etc.

Various dynamic and operating parameters may be analyzed and correlated with traffic flow parameters to facilitate the generation of traffic configuration templates. For example, acceleration and braking styles, lane change styles, turn signal utilization, vehicle position, driving speeds, other operating characteristics may be collected and analyzed to determine vehicle dynamic parameters correlated to high levels of traffic flow efficiency and safety for a particular road region, or series of road regions. Other circumstantial data may be collected and analyzed as well. For example, environmental data such as weather, time of day, or time of year may be analyzed to determine their effect on ideal traffic configuration parameters. Such implementations may be useful so that traffic template instructions may be applied according to the present circumstances.

Traffic configuration parameters may define positional, dynamic, and operational parameters or characteristics of vehicles within a road region. Traffic configuration parameters, as used herein, may be parameters that are monitored from real world traffic conditions or parameters that are fed into a template generator to generate traffic instructions to vehicles on the road. The traffic configuration parameters may be used to generate vehicle configuration templates defining an optimal configuration for each of a plurality of vehicles within a road region and for a given time period.

Vehicle configuration templates may be communicated to and implemented by one or more vehicles in a communicative relationship to automatically configure themselves to achieve the optimal vehicle configuration for achieving a desired traffic flow. In certain implementations, a detected change in a vehicle configuration may be analyzed to determine the effect on the traffic flow and to assist in correlating the effect of vehicle configuration parameters on traffic flow efficiency and safety.

Data analytics, artificial intelligence (AI), and machine learning (ML) technologies may be implemented to collect and analyze vehicle configuration data and traffic flow to build models and templates for vehicle configurations. Templates may be stored in the vehicles, or elsewhere, and retrieved and applied upon the request of the vehicle or when the vehicle enters a defined area.

In the embodiments described herein, vehicles may be configured to be semi-autonomous or completely autonomous. In implementations, the driving parameters and expected future driving parameters (e.g., a current destination, an anticipated lane change, an anticipated stop, etc.) may be communicated to other vehicles through V2V and/or V2X communications so that vehicles are able to anticipate the driving behavior of other vehicles, especially those vehicles within a common road region or vehicles expected to be within the same region. As described herein, information pertaining to the driving behavior of vehicles may inform driving characteristics of a fleet of vehicles, including specific maneuvers such as a lane change, increase in speed, or other operations, to facilitate cooperation between numerous vehicles on a roadway.

FIG. 1 is an example vehicle with which the technology disclosed herein may be implemented. For example, instructions received by a vehicle requiring a form of actuation of a vehicle system (i.e., an instruction to conform a vehicle position and/or speed to a vehicle configuration template) may be implemented by electronic control unit 50. The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. Although the example described with reference to FIG. 1 is a hybrid type of vehicle, the systems and methods for autonomous vehicle dynamics can be implemented in other types of vehicle including gasoline-powered or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 102 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 102 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 102 and may powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be implemented to detect not only vehicle conditions but also to detect external conditions as well. Sensors that might be used to detect external conditions may include, for example, sonar, radar, lidar or other vehicle proximity sensors, and cameras or other image sensors. Image sensors can be used to detect, for example, traffic signs indicating a current speed limit, road curvature, road grade, obstacles, and other information relating to a roadway. While some sensors can be used to actively detect passive environmental objects, other sensors can be included and used to detect active objects such as those objects used to implement smart roadways that may actively transmit and/or receive data or other information.

Sensor information and other operating information of electronic control unit 50 may be communicated to other vehicles for the purpose of facilitating the vehicle positioning system described herein. In certain embodiments, information may be communicated to specific vehicles or a group of vehicles. As described herein, signals containing sensor or other operating data may be communicated to a server prior to being broadcast to a network of vehicle with access to a database containing information transmitted by the network of vehicles.

Figure 2:
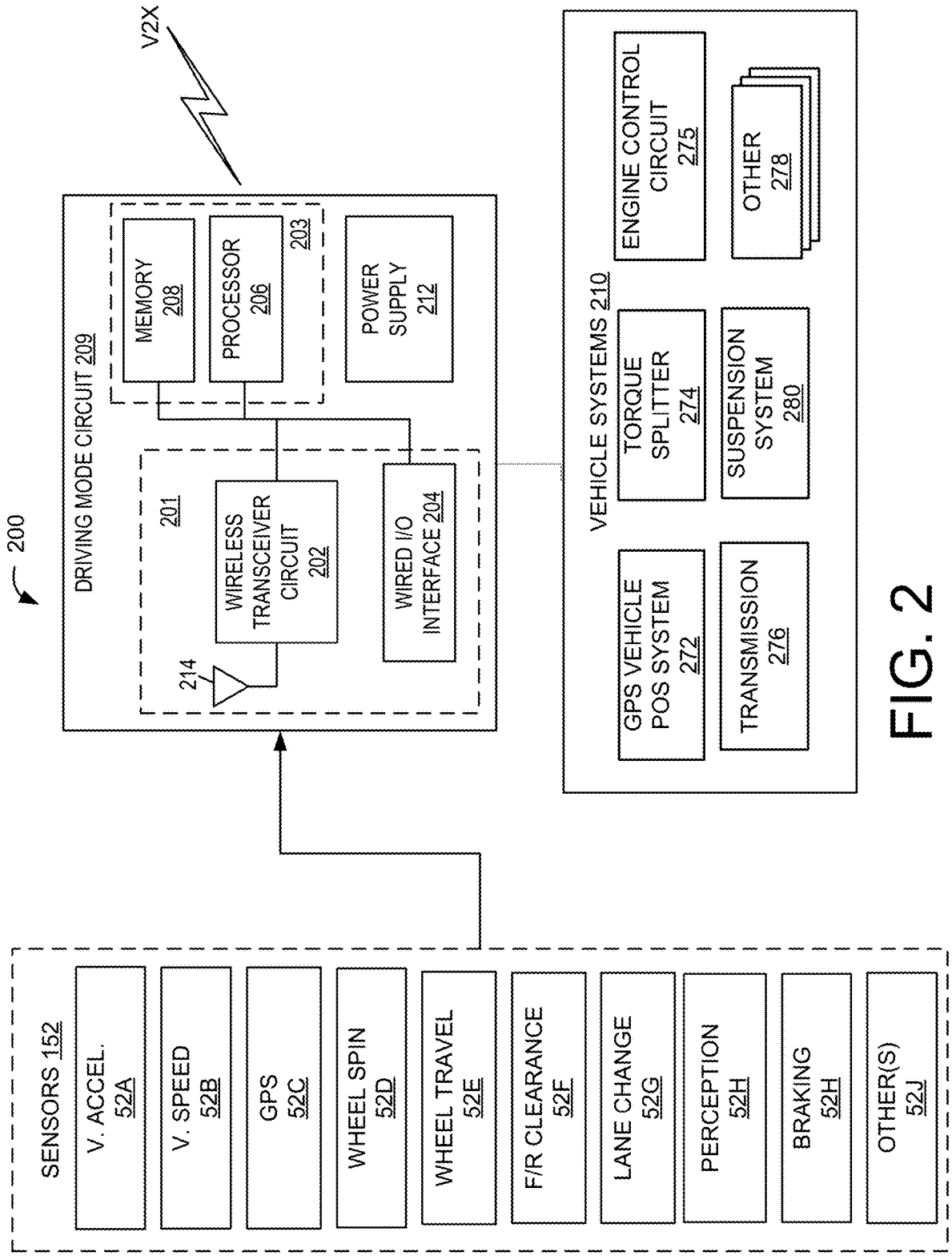
FIG. 2 illustrates an example vehicle system architecture for automated vehicle positioning in accordance with the embodiments described herein.

FIG. 2 illustrates an example vehicle system architecture adapted for automated vehicle configuration in accordance with one embodiment of the systems and methods described herein. Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms may be implemented to make up a driving mode circuit 209 according to logic described herein.

Communication circuit 201 may comprise a wireless transceiver circuit 202, an associated antenna 214, and a wired I/O interface 204 with an associated hardwired data port (not illustrated). Wireless transceiver circuit 202 may enable wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 may be coupled to wireless transceiver circuit 202 and is used by wireless transceiver circuit 202 to transmit radio frequency signals (RF signals) wirelessly to wireless equipment with which it is connected and to receive radio signals as well. These RF signals can include information of almost any sort that is sent or received by driving mode circuit 209 to/from other entities such as sensors 152 and vehicle systems 210.

Wired I/O interface 204 can include a transmitter and a receiver (not shown) for hardwired communications with other devices. For example, wired I/O interface 204 can provide a hardwired interface to other components, including sensors 152 and vehicle systems 210. Wired I/O interface 204 can communicate with other devices using Ethernet or any of a number of other wired communication protocols whether standardized, proprietary, open, point-to-point, networked or otherwise.

Power supply 212 may include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it may include any other suitable power supply.

Sensors 152 can include, for example, those described above with reference to the example of FIG. 1. Sensors 152 can include additional sensors that may or not otherwise be included on a vehicle with which the automated vehicle positioning system is implemented. In the illustrated example, sensors 152 include vehicle acceleration sensors 52A, vehicle speed sensors 52B, GPS 52C, wheelspin sensors 52D (e.g., one for each wheel), wheel-travel sensors 52E (e.g., one for each wheel), vehicle clearance sensors 52F (e.g., to detect following distances), lane change sensors 52G, perception sensors 52H and braking sensors 52H. Additional sensors 52J can also be included as may be appropriate for a given implementation of geofenced vehicle dynamics system 200. Sensors 152 may be used to gather data that can be used to evaluate driving behaviors, operating characteristics, and the real-time position of vehicles. Information gathered by sensors 152 may be communicated to one or more vehicles in a communicative relationship as described herein.

Perception sensors 52H may be implemented to observe real world input. Perception sensors may be one or more of an image sensor, including but not limited to radar, sonar and lidar, a camera, a microphone, or any audio capturing device. Perception sensors 52H may provide image data or raw data to be processed by processor 206. Processor 206 may reconstruct, analyze, or process information received by perception sensors 52H to detect objects, calculate distances, or otherwise observe real world traffic behavior. For example, processor 206 may be configured to determine relative vehicle motion, location, or distance of vehicles to facilitate determining a vehicle configuration template, or responding to a change in a vehicle configuration.

As described herein, vehicles connected to the vehicle position system network may communicate information pertaining to a configuration to facilitate the real-time determination of vehicle configurations and to support learning models configured to generate and adjust configuration templates. Information captured or received from sensors 152 may be transmitted and received by one or more vehicles as described herein.

Vehicle systems 210 can include any of a number of different vehicle components or subsystems used to control or monitor various aspects of the vehicle and its performance. In this example, the vehicle systems 210 include a GPS or other vehicle positioning system 272; torque splitters 274 that control distribution of power among the vehicle wheels such as, for example, by controlling front/rear and left/right torque split. Engine control circuit 275 may be configured to control the operation of an engine, transmission 276, and suspension system 280 such as, for example, an adjustable-height air suspension system or an adjustable-damping suspension system. During operation, driving mode circuit 209 can receive information from various vehicle sensors to collect information that may be used to determine a traffic configuration, a traffic configuration template, and to determine whether a traffic configuration transition should be implemented.

Communication circuit 201 can be used to transmit and receive information between driving mode circuit 209 and sensors 152, and driving mode circuit 209 and vehicle systems 210. Sensors 152 may communicate with vehicle systems 210 directly or indirectly (e.g., via communication circuit 201 or otherwise).

In various embodiments, communication circuit 201 may be configured to receive data and other information from sensors 152. Additionally, communication circuit 201 can be used to send an activation signal or other activation information to various vehicle systems 210. For example, as described in more detail below, communication circuit 201 can be used to send signals to one or more of: torque splitters 274 to control front/rear torque split and left/right torque split; engine circuit controllers 275 to, for example, control cylinder activation/deactivation, valve timing, fuel delivery, and other engine parameters; suspension system 280 (e.g., to adjust ride height or adjust suspension damping); and transmission 278 (e.g., to adjust shift points or speed of shifting gears). The decision regarding what action to take via these various vehicle systems 210 can be made based on, for example, a vehicle configuration transition sequence, or another road maneuver as described herein.

Figure 3:
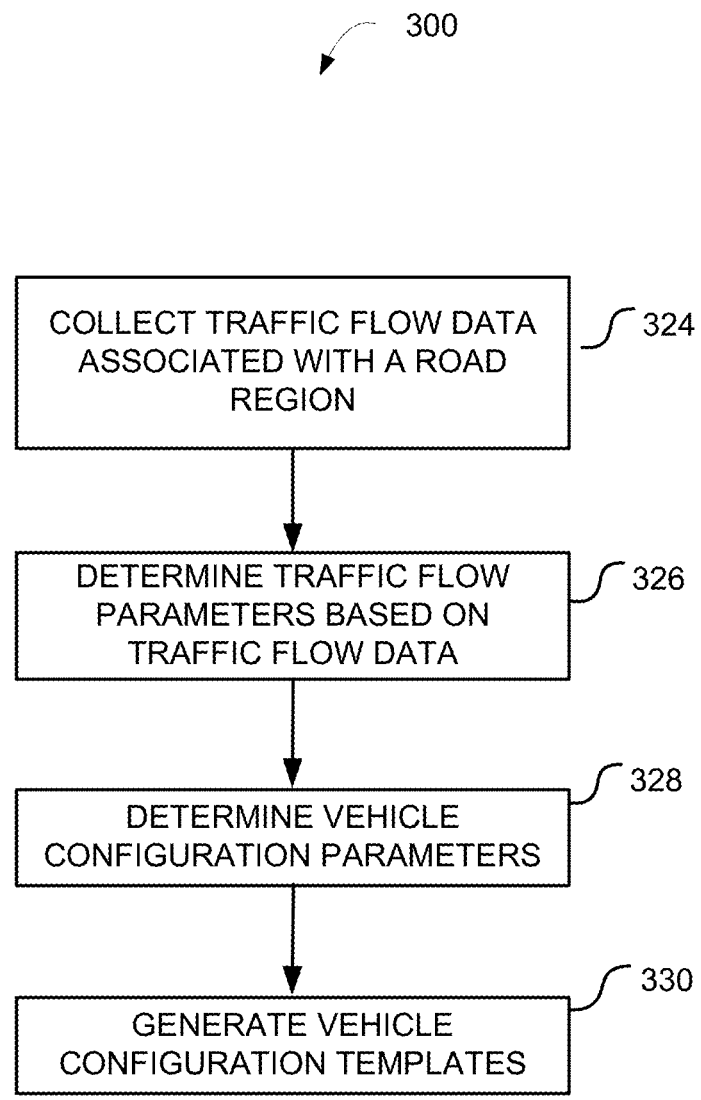
FIG. 3 illustrates an example method of determining vehicle configuration parameters to generate vehicle configuration templates.

FIG. 3 illustrates a method 300 of determining vehicle configuration parameters to generate vehicle configuration templates. The template generating model may utilize various machine learning methods and models to determine optimal traffic configuration parameters based on traffic data, and to generate optimal vehicle configuration templates accordingly, wherein vehicle configuration templates may define vehicle behavior on a road regions. Some embodiments of the invention are illustrated through block or flow diagrams having sequential operations, however it is to be understood that the operations (or subsets of operations) described herein are capable of being performed in any order or in isolation.

In operation 324, traffic flow data associated with a road region may be collected. In implementations, a road region may be an imaginary boundary, line, plane, shape, or area associated with a region of road. For example, a road region may comprise a geo-fenced boundary, or any other boundary definable through GPS or another coordinate system. In other implementations, a road region may correspond to an area length, or portion of a road, or any other channel or medium of transportation, with a common traffic rule set. For example, an entire length of a one way road may be considered a road region so long as the one road does not experience any traffic rule change such as would be the case, for example, an intersecting street or the addition of another lane. In the example of a highway, there may be a change in a traffic rule set when the first lane of a five-lane highway turns into an "exit only" lane, thereby eventually eliminating a lane and creating a traffic flow gradient towards the exit lane for vehicles based on their destination requirements.

Traffic rules include, but are not limited to speed changes, addition or changes to lanes, changes in a lane type (speed of lane, direction, preparation for a required vehicle maneuver, etc.), intersecting roads, traffic signals, pedestrian crossings, and others. As described herein, dividing roads into regions may assist in understanding the effects of traffic rule changes on traffic flow and may optimize the data collection pertaining to such changes using techniques described herein.

Vehicles traveling through or on a road region may transmit data pertaining to a vehicle configuration. For example, a vehicle may transmit its position, speed, acceleration, sensor information, and vehicle system information to a communication network to be received and/or processed by other vehicles or aspects of the systems described herein. In implementations, the system may implement distributed computing and V2X communications to determine a substantially real-time vehicle configuration for a plurality of vehicles on a road region. Accordingly, data may be collected, organized, and analyzed according to the road region from which it was received. The systems and methods described herein may be configured to collect region-specific data for the purpose of understanding and optimizing traffic flow within regions and across adjacent or multiple sequential regions. In specific embodiments, vehicle configuration data may be collected at specific locations, such as for example, the boundaries of road region or discrete points within a road region. Such implementations may conserve communication and/or processing resources and still effectively analyze traffic flow through averaging models, statistical models, or traffic flow simulations.

In operation 326, traffic flow parameters may be determined based on traffic flow data. Traffic flow may be analyzed for example, along a one- or two-dimensional pathway in the direction of traffic. In some implementations, traffic flow data may be analyzed with respect to an entire highway, or with respect to individual lanes. As described herein, a plurality of vehicle configurations may be communicated to determine an aggregate traffic configuration. Analyzing the change in a traffic configuration with respect to time reveals dynamic traffic flow information pertaining to a particular region. For example, collecting vehicle configuration information for a plurality of vehicles on a road region at a region's two boundaries (assuming two boundaries for planar, highway road regions) would yield vehicle input and output information for that particular region. As the length of a region, or distance traveled between data collection events, may be known, average velocities and other vehicle dynamics may be calculated based on discrete data collection events. In communication environments with sufficient processing and bandwidth capabilities, real time traffic configuration information may be observed and analyzed for its flow properties.

Traffic flow parameters may generally comprise parameters, variables, or features pertaining to the movement of vehicles along a pathway over time. For example, the number of vehicles that pass through a road region per unit time may be considered a traffic flow rate, at least with respect to the lane the vehicle was driving on. Speed, time-mean speed, and space-mean speed may be determined or observed to determine the flow rate with particular lanes or road regions. Similarly, other statistical vehicle dynamic information may be received and processed for understanding traffic flow.

In implementations, the traffic density of a particular region may be analyzed. Traffic density may refer to the number of vehicles per unit length of the roadway. In other implementations, the density may refer to the length of vehicles per unit length of road, as vehicles may vary in size. Further, a critical density and jam density may be determined. A critical density may refer to a maximum density achievable under free traffic flow. A jam density may refer to the maximum density achieved under a traffic congestion event. Such parameters may be correlated, as described herein, to learn the effects of traffic configuration parameters on traffic flow and congestion and to determine optimal traffic configuration parameters accordingly.

Various methods of analyzing traffic flow parameters exists. For example microscopic scale analysis may be applied, considering each vehicle as an individual unit. A dynamic motion equation, flow analysis equation, or other differential equation may be applied for each vehicle. Cellular automation models can also be used, where the road is divided into cells, each of which contains a moving car, or is empty. For example, the Nagel-Schreckenberg model may describe a method of cellular automation model to analyze traffic flow behavior and parameters.

Additionally, macroscopic scale analysis may be applied. For example, models of fluid dynamics, or systems involving partial differential equations may be employed to determine aggregate values of interest relating to optimal traffic flow. For example, optimal traffic flow parameters may relate to the density of vehicles, their mean velocity, or an average traffic flow profile. Other methods, such as a hybrid method or mesoscopic (kinetic) scale methods may be employed to model traffic flow for the various purposes described herein.

In operation 328, vehicle configuration parameters may be determined based on the traffic flow parameters. In implementations, various techniques and models may be implemented to mathematically describe the configuration of vehicles based on traffic flow data. As a non-limiting example, at a given moment in time, operation 328 may involve determining the speed, location, clearing distance, vehicle dimension, lane, direction, destination, and other parameters for vehicles within a particular road region based on an analysis of the traffic flow data. Vehicle configuration parameters may define a vehicle configuration for a single vehicle or a group of vehicles within one or more road regions.

A vehicle configuration may refer to vehicle dynamics or position. As described herein, vehicle dynamics may be determined based on information received from vehicles. For example, a vehicle configuration may comprise a vehicle speed, acceleration, motion, or other operational characteristic (i.e, percentage actuation of a brake, steering wheel input, throttle level). A vehicle configuration may comprise the real-time speed of a plurality of vehicles within a road region.

A vehicle configuration may also refer to a vehicle's absolute or relative position. Position may be collected, for example, through real time GPS monitoring. In other implementations involving the real time collection of vehicle data, point flow analysis methods may define numerical values representing vehicle position and dynamics. In some embodiments, discrete datapoints collected at certain locations (i.e., region boundaries) may facilitate the calculation of average positional parameters. For example, headway is the inverse of flow and defines the time that elapses between the ith vehicle passing a reference point and the (i+1)th vehicle. By understanding the time by which vehicles through, into, out of, or across boundaries or other data capture moments, the distance between vehicles on a road may be calculated or averaged.

In implementation described herein, the determined vehicle configuration parameters may be correlated to optimal modes of traffic flow. As discussed above, traffic flow may be defined by the number of vehicles passing a reference point, or region, per unit of time. Periods of optimal, high, or efficient traffic flow may be analyzed to determine correlations between the various vehicle configuration parameters and modes of traffic flow. That is, monitored traffic configuration parameters may be negatively or positively associated with traffic flow by observing correlations between vehicle configurations and measured levels of traffic flow. These configuration parameters associated with efficient traffic flow may thus be determined and used in the vehicle configuration template generating process.

In certain implementations, traffic flow may also consider safety in determining the optimal configuration parameters. Thus, while certain vehicle configuration parameters (i.e., speed) may be associated with optimal traffic flow, they may be negatively correlated with a level of safety due based on a number of reported collision event. Thus, parameters describing optimal traffic flow may consider both safety and efficiency metrics.

In operation 330, a vehicle configuration template may be generated. As discussed herein, optimal vehicle configuration parameters may be determined based on their correlations to efficient traffic flow and safety. These parameters may define vehicle configuration templates that may be then used to instruct fleets of autonomous vehicles. Vehicle configuration templates may define dynamic and position parameters for individual lanes. Different vehicle configurations templates may be applied to consecutive regions to accommodate for different traffic rules and to facilitate natural transition between different traffic configuration modes.

Vehicle configuration parameters for templates may be comprise dynamic parameters or positional parameters. A dynamic parameter relates to the configuration of a vehicle on a roadway with respect to time. Examples of dynamic parameters include speed and acceleration. Dynamic parameters can be specific to individual vehicles within a region, specific to a lane, or global to all vehicles. For example, a dynamic parameter may set all lanes of a highway to have a constant speed of 70 miles per hour. In other implementations, different dynamic parameters may be set to different lanes establishing a speed gradient across different lanes. Variability in dynamic parameters permits dynamic parameter design choices that can increase safety by increasing predictability and increase efficiency by establishing the speed of lanes based on the destination requirements of the vehicles.

In some implementations, a positional parameter may relate to a vehicle position with respect to other vehicles. For example, a positional parameter may define, for example, a minimum clearance distance between two vehicles in the same lane, or two or more vehicles in one or more adjacent lanes. In other implementations, a position parameter may be the number of vehicles in a region at any given time or across a period of time.

Combinations of dynamic parameters may be applied to accommodate for changes in traffic rules across road regions. For example, a road region anticipating an exit lane (or some other traffic rule change requiring a change in speed) may set a deceleration for a necessary distance to achieve the ideal speed prior to the exit or turn. At the same time, certain vehicle may wish to enter the lane, requiring a position change from the moving vehicle, and possibly a position change from vehicles in the desired lane to accommodate the new vehicle. Parameters for traffic configuration templates for specific road regions may also be manually defined to enable design choice and experimentation.

Vehicle configuration templates may be stored. In embodiments, templates may be defined by a road region to which they pertain, a time period, or even a weather condition. Historical traffic and weather data informing the template generation may be used inform the traffic configuration parameters based on the time of day, weather, and several other parameters alone or in combination. An appropriate traffic configuration template may be applied based on circumstances for ideal and consistent traffic flow control.

Figure 4:
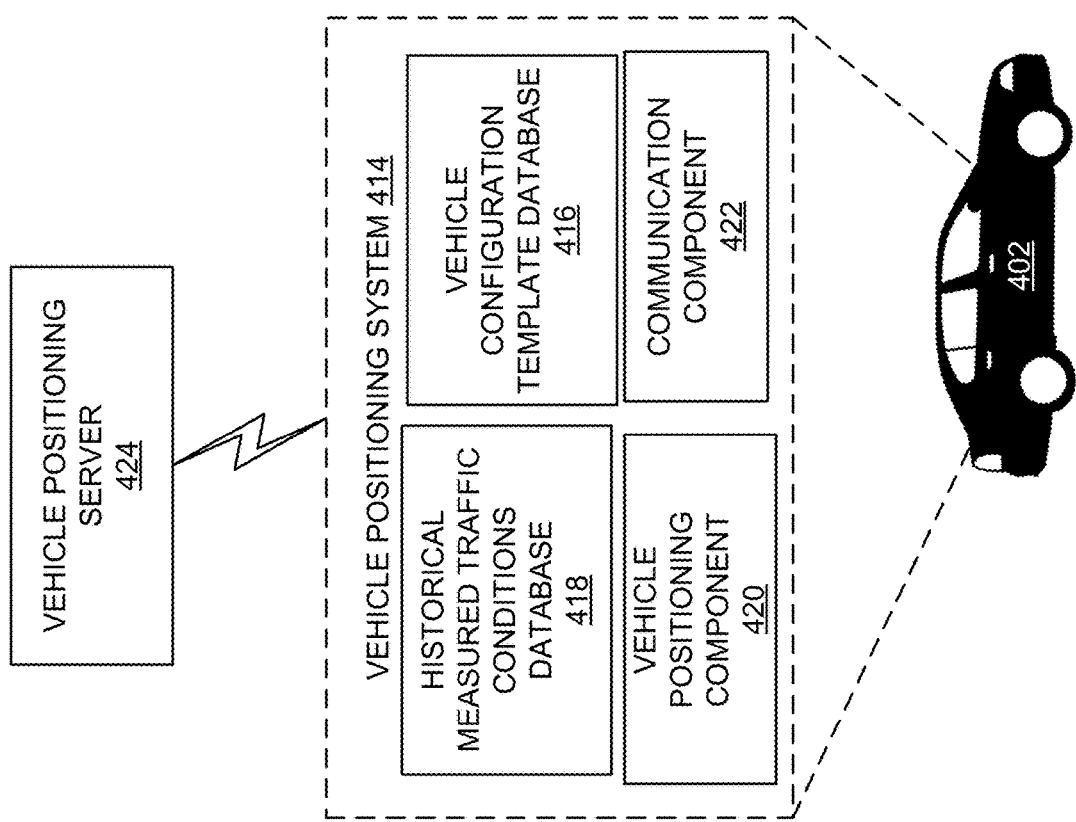
FIG. 4 illustrates an example vehicle and communication system configuration for positioning autonomous vehicles in accordance with the embodiments described herein.

FIG. 4 illustrates an example communication system configuration for positioning autonomous vehicles. In implementations, the various functions and capabilities of vehicle positioning system 414 may be performed onboard the vehicle 402, on one or more remote computing devices, or partially onboard. Similarly, data accessed by vehicle position system 414 may be stored across one or more storage devices in a communicative relationship.

Vehicle positioning system 414 may comprise a historical measured traffic conditions database 418. As described herein, information pertaining to traffic flow data, weather data, time-based data, region data, and traffic event data may be collected and analyzed to determine their correlation to the traffic flow for a given region.

Vehicle configuration template database 416 may comprise template vehicle configurations for given regions of road. Templates may be accessed by vehicles or communicated to vehicles so that they may have vehicle configuration instructions pertaining to road regions relating to their destination. Templates may, for example, pertain to one or more regions of road defined by at least the road geometry, the number of lanes, the type of lane, speed limits, barriers, crowd sourced infrastructure data. Regions may have a length and a width, where the length is parallel to the flow of traffic and the width is perpendicular to the flow of traffic. In certain implementations, each region may comprise a section of a roadway having two boundaries perpendicular to the flow of traffic. A road or highway may be defined by several discrete road regions, where the increase in the number of regions results in an increased resolution of traffic flow metrics. Regions may be equal in width or may have different widths depending on a road or traffic condition. Regions may be defined by GPS data, a position determination system, various geo-fencing methods, or manually defined.

Region locations may be determined based on areas of traffic flow interest. For example, regions may be placed near areas preceding a change in a traffic rule. Additionally, sequential regions may be more concentrated before and after such locations to facilitate data collection methods and flow analysis specific to regions experiencing traffic rule changes. A template corresponding to a region may comprise information pertaining to road geometry (i.e., dimensions, number of lanes, etc.), lane capacity (i.e., the permitted number of cars per lane in a region), traffic rules (i.e., speed, a defined lane purpose). Thus, regions may be placed before, after, and throughout lengths of road containing changes in traffic rules (i.e, an exit lane preparing for a reduction in the number of lanes) to greater understand the effects of traffic rules on traffic flow. As described herein, the boundaries of regions may defined data collection points for monitoring and analyzing traffic flow information. Through discrete region-based data collection, flow information can be greater understood and can thus optimize template generation as described herein.

Vehicle positioning component 420 may be configured to implement a vehicle transition sequence. As described herein, a vehicle transition sequence may comprise one or more driving maneuvers required to change the configuration of a vehicle. In some implementations, a vehicle transition sequence may comprise one or more of an acceleration, a deceleration, a lane change, or any other actuation of a vehicle system component described herein.

Communication component 422 may communicate to the vehicle 402, other vehicles, vehicle positioning server 424, or the other databases and components of the vehicle positioning system 414 through a wireless communication protocol. In some embodiments a wireless communication protocol may be TCP/IP, Bluetooth BLE, or cellular network protocols such as 3G, 4G, 5G, or LTE.

Figure 5:
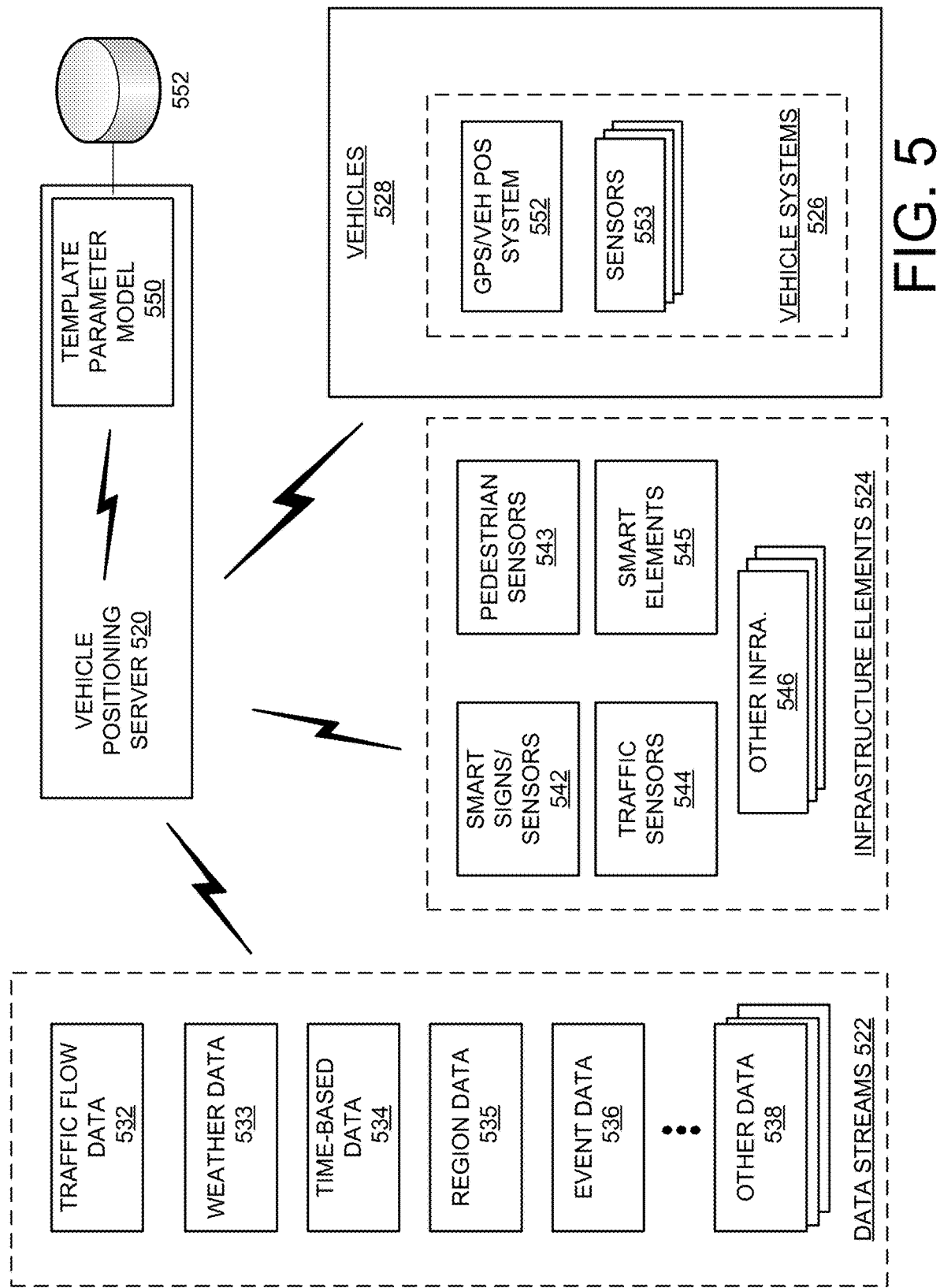
FIG. 5 illustrates an example system for data collection, data distribution, data storage and analysis for automated vehicle configurations in accordance with the embodiments described herein.

FIG. 5 illustrates an example system for data collection, data distribution, and data storage for automated vehicle configurations in accordance with one embodiment. In certain implementations, a vehicle positioning server 520 may be configured to operate the vehicle positioning system as described herein. Vehicle positioning server 520 may be communicatively coupled to one or more data streams 522, infrastructure elements 524, vehicle systems 526 and other vehicles 528. The vehicle positioning server may facilitate the sharing and processing of information received from one or more of the data streams 522, infrastructural elements 524, and vehicle systems 526 between vehicles 528.

Data gathered by the various elements may be used by the vehicle positioning server 520 to facilitate the operation of the vehicle positioning system described herein. The vehicle positioning server 520 may be configured to receive or use information related to vehicle sensors, a vehicle navigation system, vehicle attributes, and other operational parameters described herein.

Vehicle positioning server 520 may be a processor-based system configured to communicate to and receive information from a plurality of vehicles. Such information may be processed to determine optimal vehicle configuration, generate and communicate vehicle configuration templates, and to issue instructions. Portions of the processes or functions described herein may be performed by components controlled by various actors. For example, vehicle positioning server 520 may comprise a circuit local to a vehicle. In other embodiments, vehicle positioning server 520 may be a remote server, edge network, or other processing system (e.g. a cloud server) in communicative contact with a vehicle.

Vehicle positioning server may be operable to perform functions defined in the technical specifications underlying 5G cellular networks. For example, positioning server 520 may implement a distributed, or edge-computing system with functionality distributed among multiple vehicles or among one or more vehicles and a remote server, and so on. As described herein, functions described as involving a region, a vehicle, or a particular group of vehicles may be localized to particular computing units. Such systems are well adapted to store, share, and process data relating to vehicle dynamics and controls, and consequently to perform the functions described herein. For example, instructions involving a group of vehicles can be easily communicated, shared, and processed between groups of vehicles increasing the real-time effectiveness of the systems described herein.

In the illustrated example, data streams 522 may provide information to vehicle positioning server 520. Data streams may comprise of services that provide traffic flow data 532, weather data 533, time-based data 534, region data 535, event data 336, and any of a number services to provide other data 336. The data streams 522 may be third-party services, subscription based services, proprietary or closed services, government or public access services and so on. These data streams 522 can provide raw or processed data to vehicle positioning server 520 depending on the implementation.

Traffic flow data 532 may comprise of vehicle dynamic information, position information, traffic patterns, location information, speed information, and lane information. Traffic patterns may pertain to particular road regions or groups of road regions. For example, a direction mapping service may collect data of vehicle movement associated with traffic in certain regions. Data such as time delays, congestion areas, etc. can be provided to vehicle positioned server 520. Location, speed information, and lane information may partition the roadways into different traffic congestion sections, associating these areas with specific speeds that vehicles are traveling, and further breaking down the location section information into lane specific data regarding vehicle movement. The location information, speed information, and lane information, can be provided to the vehicle positioning server both individually or in conjunction to optimize lane-specific and roadway-specific vehicle configurations.

Weather data 533 may comprise of climate and weather condition information of a particular region where vehicles are being operated. For example, a weather news station may collect data regarding the temperature, humidity, precipitation, wind speed, sunlight, as well as predict these weather conditions based on previous observations in the region. The weather data 533 may be provided to vehicle positioning server 520 to understand the effects of weather events on traffic flow parameters, and consequently to optimize vehicle configuration for certain weather circumstances.

Time-based data 534 may comprise of data regarding vehicle movement based upon different temporal intervals. For example, data regarding vehicle movement based on time of day or time period. For example, a direction mapping service may collect information regarding rush hour and peak congestion of roadways during specific periods of time. The daily time-based information 534 may be provided to the vehicle positioning server 520 to understand the effect of time on traffic flow parameters, and consequently to optimize vehicle configuration for certain time periods. Time-based data 534 may also comprise data based on a calendar date, month, or year. For example, a direction mapping service may collect information regarding peak congestion of roadways during specific months or time periods during the year. Identified congestion times, may, for example, be the roadways to beaches during school vacation weeks, and greatly affect optimal vehicle positioning instructions. This monthly or yearly time-based data may be provided to the vehicle positioning server 520.

Region data 535 may comprise of geometric and dimensional information of roadways, road type, road configurations, and non-weather related information. In some embodiments, region data 535 may comprise a plurality of defined regions on a roadway. A region may be an imaginary section of road having two boundaries in the direction parallel to the flow of traffic and a length. The boundaries may be straight or curved, depending on the orientation or geometry of the road. Regions may facilitate the analysis of traffic flow by monitoring vehicle dynamics of vehicles traveling through regions. For example, vehicle dynamics and position may be measured at the boundaries of a region as a vehicle crosses through the region. In such embodiments, a traffic flow rate of a region can be established on a per lane basis by calculating the number of vehicles crossing a region per unit time. In certain implementations, roads or highways may be divided into several regions. Creating more regions per unit length of road increases resolution for understanding and optimizing traffic flow. In other embodiments, region data may comprise geometric dimension information of a road type. For example, the number of lanes a road has, the shape of the road, and the length of the road, and the lane type (e.g., left turn, fast lane, slow lane, etc.).

Event data 536 may comprise of collision event information and special event information. Collision event information may, for example, be crowd sourced or collected by a direction mapping service and may monitor collisions that occur on roadways. Collisions may greatly impact many aspects of vehicle movement on a roadway and may significantly affect the optimal instructions for vehicle positioning. This collision event information may be provided to the vehicle positioning server 520. Special event information may, for example, be collected by the local government of a specific area which may organize special events like a parade on a public roadway, and block of the roadway for vehicle use for a particular timeframe. Special events may greatly impact many aspects of vehicle movement on a roadway and may significantly affect the optimal instructions for vehicle positioning. This special event information may be provided to the vehicle positioning server 520.

Infrastructure elements 524, in this example, may include any of a number of infrastructure components or systems such as, for example, smart roadways elements, municipal data gathering elements, and data collected by vehicles. The illustrated examples include smart signs and sensors 542, pedestrian sensors 543, traffic sensors 544, smart roadway elements 545, and other infrastructure elements 546. These elements may include a variety of sensors or other information gathering instruments or equipment to collect data that can be provided to vehicle positioning server 520.

Smart signs and sensors 542 may comprise traffic signs, speedometers, traffic lights, and other signs and sensors that collect data on vehicles and roadway regions. For example, a smart traffic sign may collect information regarding the number of cars that pass by it as well as the temperature of the surrounding environment. This data on vehicles and roadway regions collected by smart signs and sensors may be provided to the vehicle positioning server 520.

Pedestrian sensors 543 may comprise cameras, weight detectors, and other sensors that collect and monitor data regarding pedestrians on or near roadways. For example, there may be a camera positioned to monitor a cross-walk and detect when pedestrians are near or on the cross-walk. This data regarding pedestrians on or near roadway regions collected by pedestrians sensors may be provided to the vehicle positioning server 520.

Traffic sensors 544 may comprise devices that monitor vehicle flow, collision events, information associated with traffic congestion like CO2 emissions, or other devices used to collect monitor traffic data. For example, a CO2 sensor may be positioned near a roadway to monitor the CO2 emissions for a roadway region at a particular time, that can be associated with traffic conditions. This data regarding traffic information can be provided to the vehicle positioning server 520.

Smart roadway elements 545 may comprise intelligent reflector bumps, roadway weight detection devices, vehicle edge compute devices designed to communicate with vehicle systems in a certain proximity, and other smart roadway elements that collect and monitor information about vehicles and roadway conditions. For example, a roadway edge compute device may collect information from the car sensors in a 100 foot radius. This data on vehicles and roadway regions collected by smart signs and sensors may be provided to the vehicle positioning server 520 or analyzed and by the smart roadway element itself.

Other infrastructure elements 546 may comprise smart construction devices, pressure sensing barriers, or other infrastructure elements that may collect and monitor vehicle and traffic configurations. For example, a smart construction device may be able to identify the time periods when it is in operation and collect and monitor vehicle information and traffic flow. This data regarding vehicle traffic information associated with construction zones and time periods can be provided to the vehicle positioning server 520.

Vehicle systems 526, in this example, may include any of a number of longboard vehicle systems or components that might be used by or in conjunction with vehicle positioning server 520 to enable it to generate and administer vehicle positioning templates. This example includes a vehicle positioning system 552 such as, for example, a GPS positioning system; and a plurality of sensors 553, as described herein. A vehicle or plurality of vehicles 328 may serve as sources of information that may be used by vehicle positioning server 520. Vehicles 528, in this example, may include a plurality of vehicles that may sending and receiving information corresponding to vehicle position, dynamics, operations, application of a vehicle template, or any other operation described herein.

Template generating model 550 may be configured to determine optimal vehicle configuration parameters for the generation of vehicle configuration templates. Determining optimal traffic configurations or traffic configuration modifications may involve of one or more artificial neural networks configured to classify or perform regression on inputs that may comprise of data streams, infrastructure elements, vehicle systems, and traffic configuration templates.

Neural networks are computing systems inspired by the biological neural networks that constitute human brains. Neural networks may comprise an input layer, one or more hidden layers, and an output layer. Each layer may consist of one or more perceptron's commonly referred to as "nodes," which may have an activation function that may be utilized to determine an output of a node given one or more inputs. In certain implementations, neural networks may be used to determine the probability of one or more outcome events given one or more inputs.

In implementations of neural networks, forward propagation may be utilized to determine an output corresponding to the probability of one or more outcome events. In certain implementations, forward propagation may be implemented by providing an neural network with one or more inputs, such as a feature, and performing a dot product operation between input values and one or more associated weights. The result of the dot product operation may be provided as input to an activation function. In a certain implementations, the activation function may be a sigmoid function. The resulting numerical value may be comparing to an actual output value to determine an error in the neural network prediction. In implementations, one or more of the weights utilized by the neural network may be changed to minimize the error. For example, a method such as backpropagation may be implemented to determine a gradient to calculate the optimal weights to minimize error in a neural network.

In one embodiment the neural network may be "trained" on historical traffic configuration data and traffic flow data to determine an optimal traffic configuration template. Further, when determining an optimal transition sequence or modifications to traffic configurations on real-time vehicle and traffic configuration data, the neural network may use forward propagation to output the probabilities of vehicle transition sequences invoking an optimal predicted traffic flow. After the transition sequence or traffic configuration modifications have been made by the vehicles, the actual traffic flow can be calculated. Error can be calculated as the difference between the optimal predicted traffic flow and the actual traffic flow. One or more of the weights of the neural network used in the forward propagation process may be modified to minimize the error in future predictions of optimal predicted traffic flow.

As described herein, vehicle configuration templates corresponding to one or more road regions may be suitably trained on data pertaining to factors, input, and circumstances described above so that a template may be received and applied according to the specific circumstances.

Figure 6:
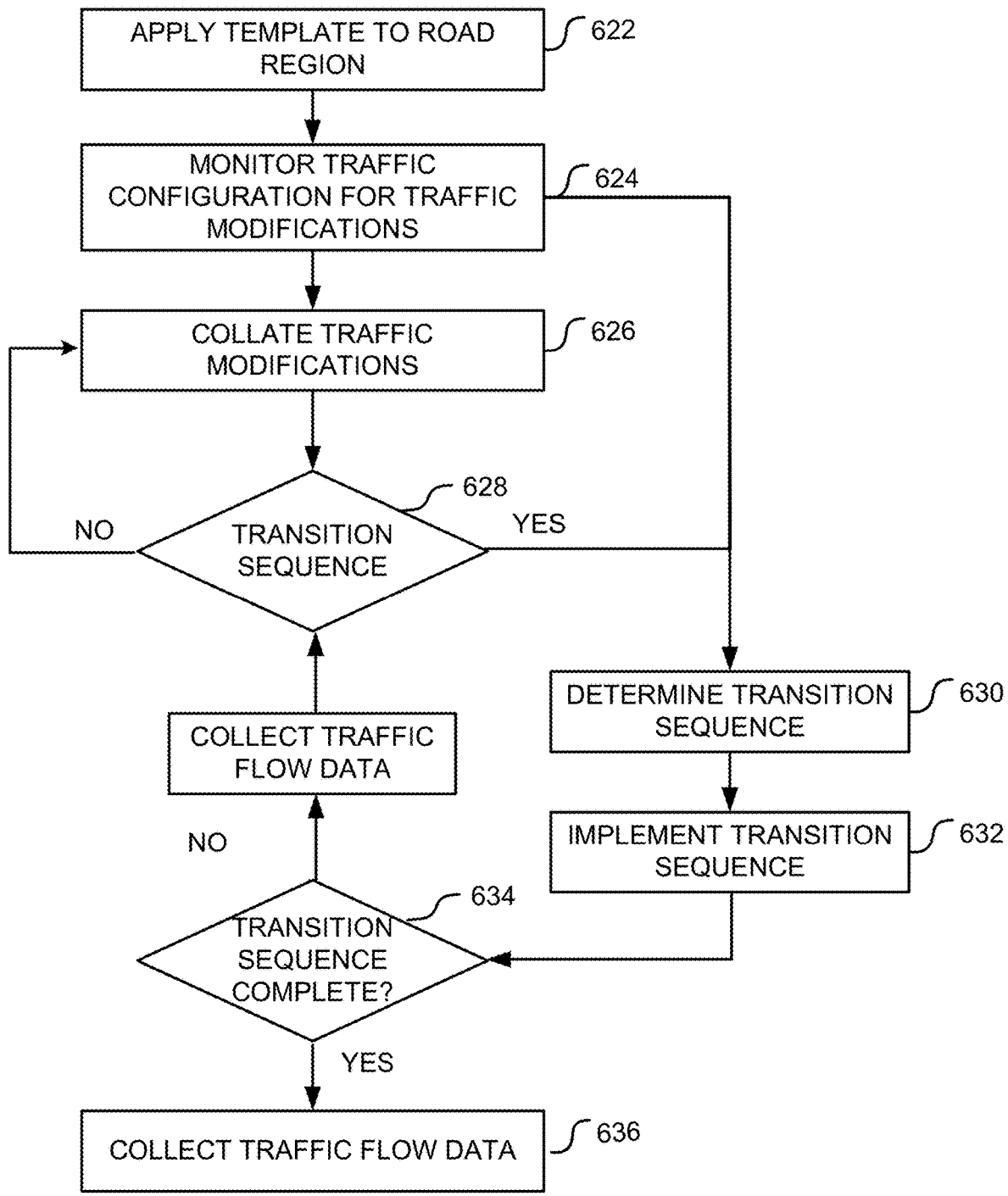
FIG. 6 is an example method for generating and implement a vehicle transition sequence for positioning configuring vehicles in accordance with the embodiments described herein.

FIG. 6 illustrates and example flow diagram for the systems and methods of automated vehicle positioning as described herein. Some embodiments of the invention are illustrated through block or flow diagrams having sequential steps, however it is to be understood that the steps and operations described herein are capable of being performed in any order or in isolation.

In operation 622, a vehicle configuration template may be applied to a road region. For example, a road region may pertain to a particular area of road comprising traffic activity. In certain implementations, a road region may comprise a length of a highway or street. A vehicle configuration template may define the positional and dynamic parameters for vehicles within that road region. For example, the number of vehicles per lane, the distance between vehicles, the speed of vehicles in each lane, the distance between vehicles in adjacent lanes, and other parameters relating to a vehicle position, dynamic parameter, or operational parameter.

In certain embodiments, vehicle configuration parameters of templates may pertain to a vehicle destination. For example, vehicle expected to travel for long periods of time according to their communicated destinations or routes may be organized into lanes accordingly. To illustrate, vehicles that are to remain on a highway for a long period of time may be configured in the far left lane (i.e., on roads in the United States) and with average speeds higher than other lanes. Conversely, vehicles with destinations requiring an upcoming driving maneuver (i.e., a lane change, turn, or exit) may be configured in lanes closer to such exits, turns, or lanes to accommodate an upcoming driving maneuver. Vehicle destinations and driving maneuvers associated with the destination (i.e., turns, lane changes, exits, etc.) may be considered in forming a vehicle configuration for particular region. In other embodiments, templates may be based on a vehicle type. For example, an emergency response scenario may correspond to a template that assigns certain lanes for exclusive access to a particular lane, set of lanes, or region.

A vehicle configuration template may be applied to a vehicle or group of vehicles within a road region by communicating an instruction to those vehicles to conform their driving behavior to the defined template configuration parameters. In some embodiments, vehicle systems may be accessed be a control module (i.e., electronic control unit 50) which may make intelligent driving decisions based on the template being applied to the vehicle. In embodiments, templates may be specific to unique vehicles, or may be uniformly applied such that each vehicle has positional and dynamic awareness of the configuration of other vehicles subject to the same configuration template.

In operations, traffic may be monitored for traffic modifications. As discussed herein, a traffic modification may be any event or anticipated event that requires a change to a vehicle configuration (i.e., positional or dynamic parameters) for one or more vehicles across one or more road regions. For example, a traffic event may include but is not limited to as a crash, the presence of a road obstacle, the presence or expectation of an emergency vehicle. Traffic events, and their respective configuration parameters, may be reported by one or more vehicles or sensors as described herein resulting in a modification to a vehicle configuration. Monitoring traffic flow parameters after the reporting of a traffic event and/or a traffic event's configuration parameters, may yield insight into its effect on traffic flow based on the event type. Such correlations may aid in the generation of traffic configuration templates suited to be applied in the event of a reported traffic event.

A traffic modification may also comprise a vehicle maneuver. In some implementations, a vehicle maneuver may comprise a turn, lane change, a change in speed, a change in direction, or any other change in actuation of a vehicle system or operation. Such maneuvers may be anticipated through destination sharing between vehicles within a region or network. Any traffic maneuver, by default, results in a change in traffic configuration. Thus, in accordance with the disclosure, traffic modifications may result in a change to a vehicle configuration template. Alternatively, different vehicle configuration templates may be generated and applied according to the anticipated change in vehicle configuration. Changes in traffic configuration, to at least some degree, result in an updated traffic configuration after the vehicle maneuver has occurred. For example, if a vehicle in a fast lane having 5 vehicles per region changes lanes to a slower lane having 3 cars per region, then the resulting vehicle configuration will contain 4 vehicles for each lane in the region. Thus, each sequential traffic modification may be defined by a discrete vehicle maneuver that results in an updated vehicle configuration template. A traffic modification may also comprise a change in a traffic rule. In some implementations, a change in a traffic rule may occur across two different regions.

In some implementations, a transition sequence corresponding to the traffic modification may be determined. A vehicle with a defined configuration that needs to update its vehicle configuration so that it may travel at a different speed in a different lane may communicate such modification so that an updated vehicle configuration may be generated. However, in order to achieve the driving maneuver, a transition sequence between the two respective vehicle configurations must be determined so as not to disrupt the flow of traffic.

In implementations, the transition sequence may be determined by assessing the individual steps required to complete a vehicle maneuver. For example, a lane change may require that vehicles in the receiving lane create space to accommodate for the incoming vehicle. However, the particular region may be defined by a maximum number of vehicles or particular minimum distance between vehicles in a particular lane. In some implementations, positional parameters of a region may be adjusted (i.e., decreasing minimum distance requirement or increasing the maximum number of vehicles for a particular lane) to accommodate the receiving vehicle. In alternative embodiments, dynamic parameters of a region may be adjusted (i.e., certain vehicles speed up to leave a region to accommodate the new vehicle while preserving certain positional parameters). In embodiments, various combinations of modifications to positional and dynamic parameters may be implemented to determine a transition sequence. In implementations, transition sequence may involve a modification to the configuration of plurality of vehicle on a road region or across multiple road regions.

In operation 632, the transition sequence may be implemented. For example, the modification of a vehicle configuration may be communicated to the vehicle, or multiple vehicles as needed, so that the vehicle may autonomously actuate its vehicle systems to achieve the transition sequence.

In operation 634, the transition sequence may be monitored for completion. While the transition sequence is occurring, traffic flow data for particular regions involved in the transition sequence may be collected to facilitate learning models. For example, the effect that a particular transition sequence has on the flow dynamics of a particular region may be observed to learn correlations between particular steps of a transition sequence and traffic efficiency or safety. Further, as shown in operation 636, traffic flow data following the completion of a transition sequence may be analyzed to determine the correlations between the updated traffic configuration and efficiency or safety.

In certain implementations, and referring to operation 626, traffic modifications may be collated before being applying a transition sequence. Where traffic flow is relatively steady and there are few anticipated traffic modifications, it may be easy to implement transition sequences as they are needed by individual vehicles. However, some road regions may disrupt the flow of traffic especially where there is a commonly used exit, street, turn, etc. In such scenarios, it may promote traffic flow efficiency to organize vehicles having common destinations (or at least common upcoming traffic maneuvers) so that aggregate transition sequences involving a plurality of vehicles may be applied. In such implementations, upcoming traffic maneuvers common to a plurality of vehicles may be queued an applied at a determined time to facilitate uniform vehicle transitions. For example, there may be several non-adjacent vehicle in a particular lane that all have a common exit. Thus, the destination requirements of one or more lane changes and an exit maneuver may be collated so that each of the vehicles may change lanes at the same time, or in some order that may depend on the a vehicle configuration parameter, such as location, speed, or even vehicle type.

Figure 7A:
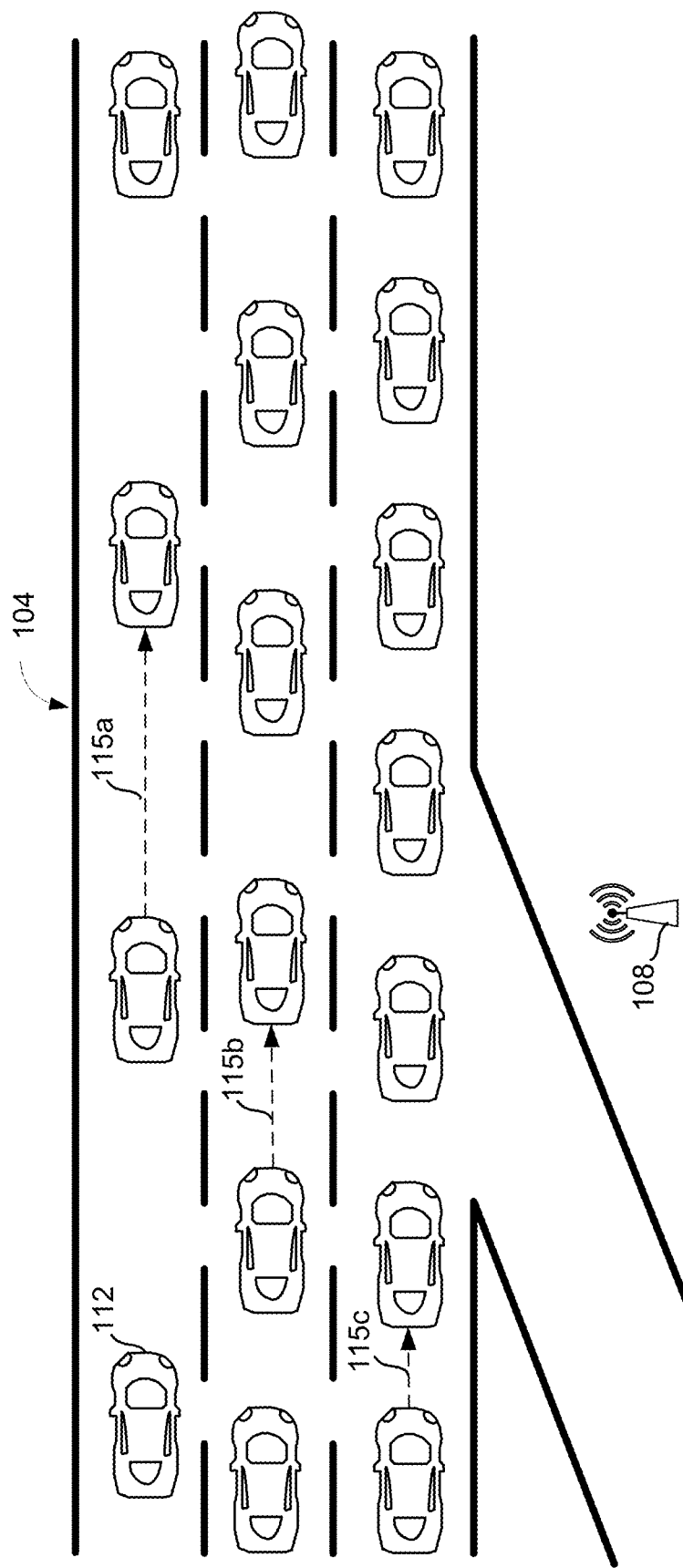
FIG. 7A illustrates an example traffic configuration in accordance with the embodiments described herein.

FIG. 7A illustrates an example vehicle configuration template for a road region in accordance with the disclosure. In this illustration, vehicle 112 are contained within a road region 104 and may be in communication through a network element 108. In the topmost lane (i.e., a "fast lane") a vehicle configuration parameters may specify a minimum length 115a. In implementations, the vehicle configuration template of the lane may specify static velocity (e.g., a velocity higher than adjacent lanes). Similarly, the vehicle configuration may define other minimum clearing distances 115b and 115c corresponding to other lanes. As would be appreciated by a person having skill in the art, various configuration parameters may be designed based on principles of efficiency, safety, organization, and public health.

Figure 7B:
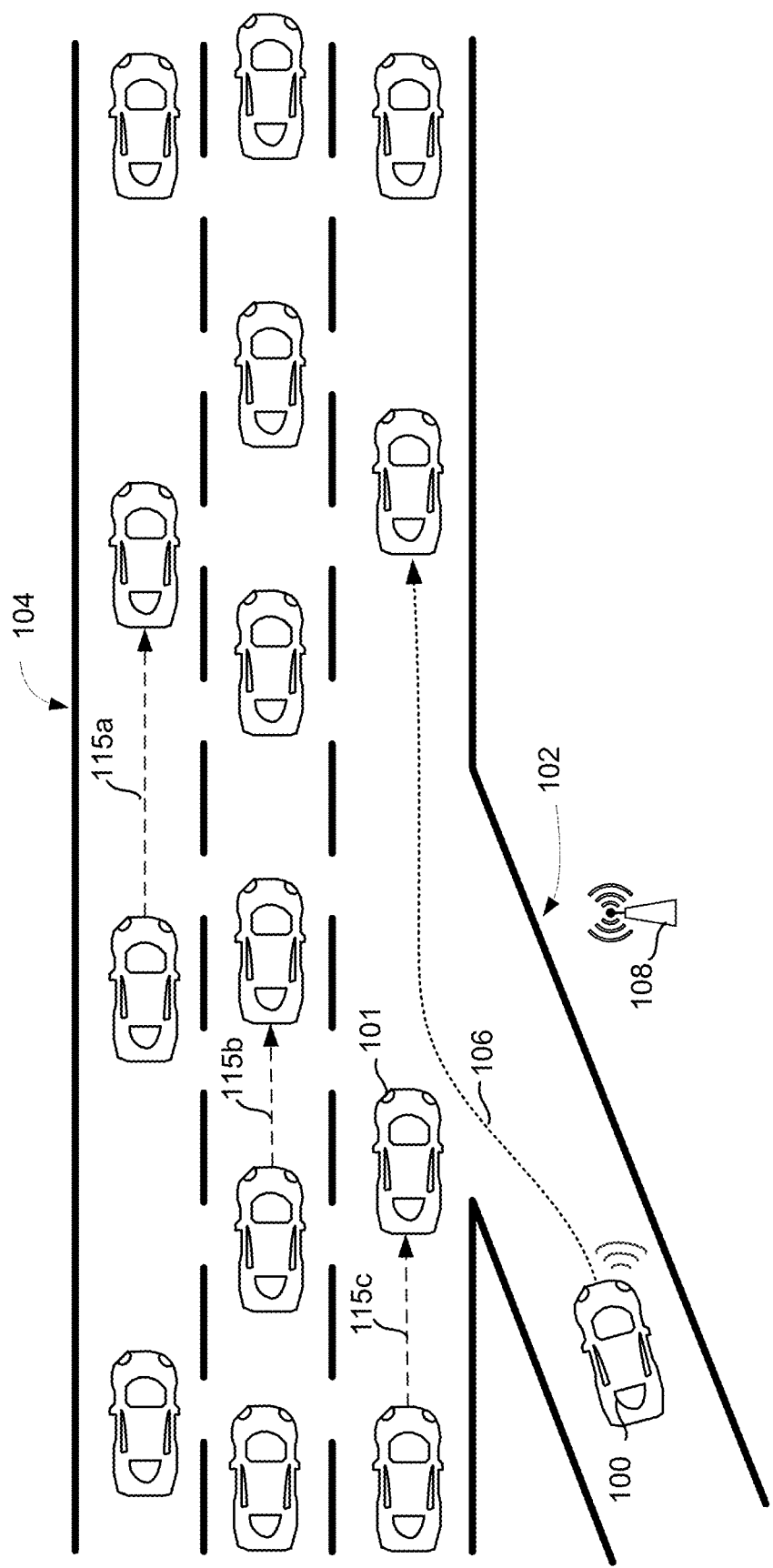
FIG. 7B illustrates an example traffic configuration with a merging vehicle in accordance with the embodiments described herein.

FIG. 7B illustrates an example vehicle configuration template that is experiencing a traffic modification. For example, vehicle 100 has a destination 106 that requires entrance into the road region 104. However, comparing to FIG. 7A, it may be unsafe or inefficient for vehicle 100 to enter into the road region if the minimum distance 115c of the receiving lane is too small or perhaps smaller than the vehicle itself. Thus, a traffic modification may be required because vehicles in at least that lane must modify some configuration parameter to accommodate the incoming vehicle. In the example implementation, vehicle 101 may actuate a brake or otherwise decelerate to accommodate incoming vehicle 100. Such a deceleration may be propagated to vehicles behind vehicle 101 to avoid back end collisions. In implementations, after the transitioned has occurred, the vehicle configuration may return to a relatively static vehicle configuration template accounting for the additional vehicle. As described herein, road rule changes may be considered in determining traffic configuration modification. In certain embodiments, the existence of an exit may corresponding to a rule change such that traffic flow parameters may be optimized for one or more road regions preceding or corresponding to the exit lane. In embodiments, vehicles may move to the exit lane at an optimum time, location, or speed to not disrupt vehicles coming on to the highway and other vehicles passing through the road region.

Figure 7C:
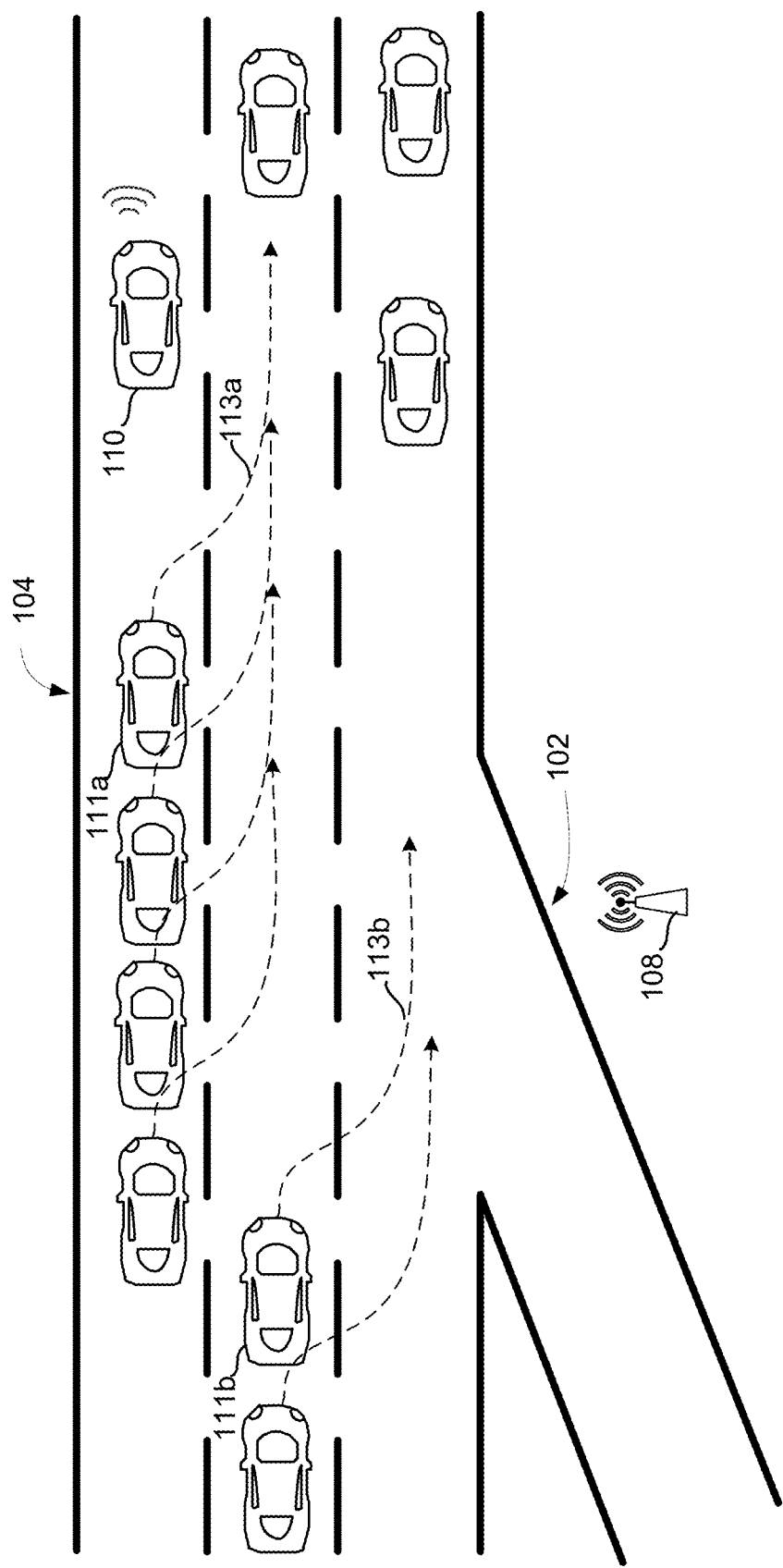
FIG. 7C illustrates an example traffic configuration and collision avoidance in accordance with the embodiments described herein.

FIG. 7C illustrates an example vehicle configuration experiencing an event based traffic modification. To illustrate, vehicle 110 may transmit a signal corresponding to a traffic event, such as a vehicle failure, collision, etc. In embodiments, the signal may comprise information as to the event type and configuration (i.e., a positional and dynamic component of the event). In such implementations, vehicles 111a may coordinate an aggregate or sequential traffic modification based on the location of the traffic event. In the example illustrated, vehicles 111a may decelerate and change lanes to avoid vehicle 110 according to paths 113b. However, such a traffic modification may have an cascading effect on other lanes because of the increase in the number of vehicle per lane. In such circumstance, the number of queued transition sequences and the destination of the vehicles undergoing a transition sequence may be considered to accommodate for the traffic maneuver. For example, vehicles 11b may slow down or change lanes according the transition 113b depending on the circumstances.

Figure 7D:
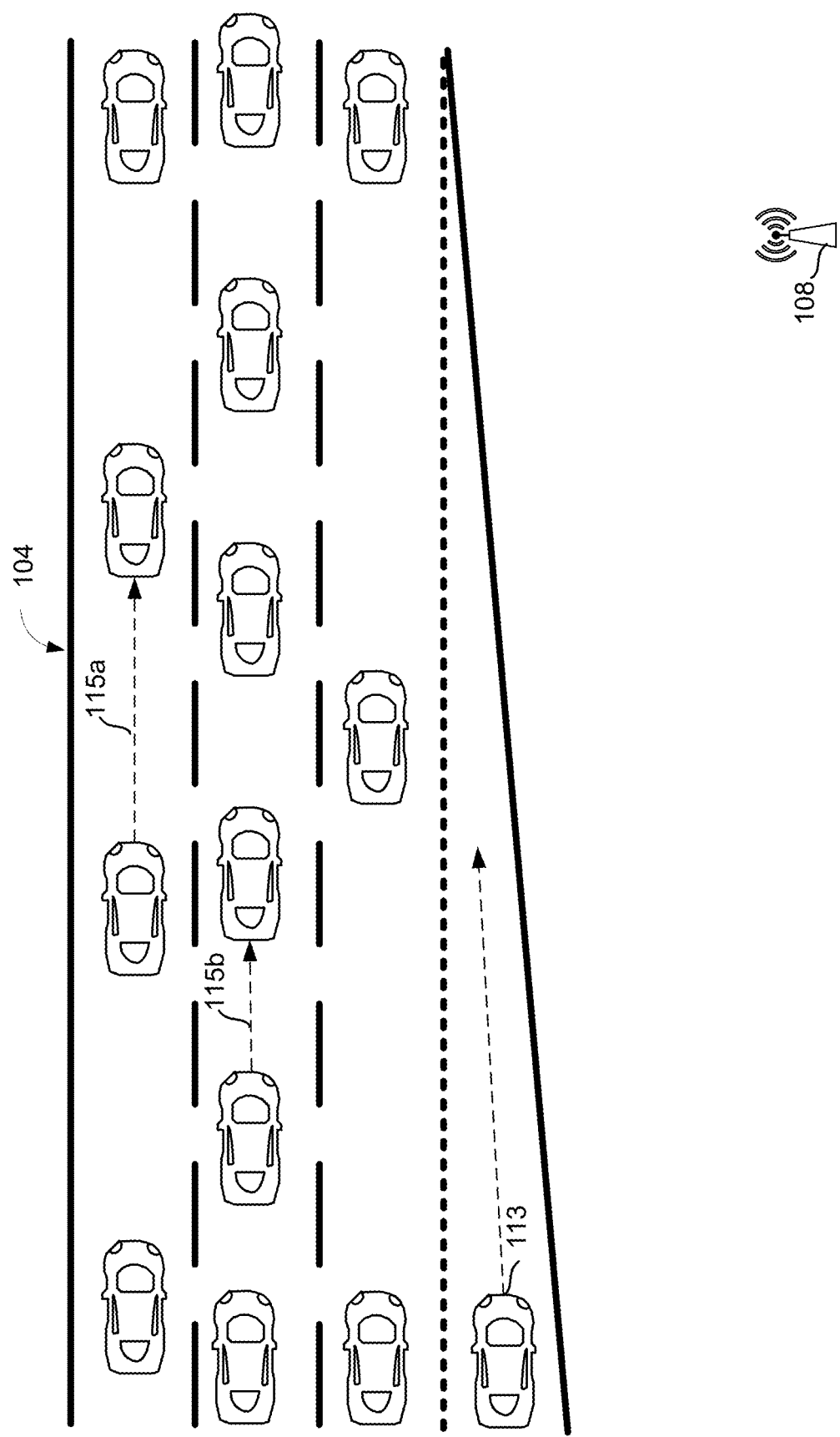
FIG. 7D illustrates an example traffic configuration with a lane reduction in accordance with the embodiments described herein.

FIG. 7D illustrates a vehicle modification based on a traffic rule change. In the illustrates example, the roadway 104 is experiencing a traffic rule change as the highway is turning from a four-lane highway to a three-lane highway. As explained herein, the existence of a traffic rule change may define a boundary of a road region. Traffic configuration templates corresponding to the rule change may be applied to the road region, thus informing the vehicles of the possibility of increased traffic density per lane after the completion of the rule change.

As illustrated, vehicle 113 may be required to make a vehicle maneuver based on the traffic rule change. Accordingly, a transition sequence may be implemented to actuate one or more of a steering, brake, or throttle input. In embodiments, vehicle 113 may assess the vehicle configuration template for the particular region to determine the real time location of vehicles within an adjacent lane. Further, vehicle 113 may accelerate or decelerate into the lane according to the predicted position of other vehicles, ensuring not to violate any prescribed ranges or thresholds of clearing distance or maximum number of vehicle per region. In other implementations, a road rule change may comprise the addition of traffic lanes such that vehicles may modify their configuration to optimize traffic flow before the lane addition or within a road region containing the lane addition.

In accordance with the embodiments described herein, traffic flow may be optimized for non-linear roadways. For example, a curved area of road may be defined by a road region or may correspond to a traffic rule change such that a traffic configuration for the curved area may be optimized in anticipation of the curved road. As discussed herein, various traffic flow analysis techniques may be implemented to determine the optimum speed of vehicles for a curved area of road, such as a turn, bend, or curve. Vehicles may be configured to modify their traffic configuration to conform to one or more traffic configuration parameters corresponding to the optimal traffic flow (i.e, an optimal number of vehicles per lane, an optimal speed, an optimal braking force, etc.). In an embodiment the system described herein may determine an optimal throughput of N vehicles per unit time for a given lane of a curved road region. When it is determined that M vehicles are in the lane approaching the curved road region, where M does not equal N, the system may implement a traffic configuration modification to adjust the number of vehicles per lane to conform to optimal vehicle configuration parameters. If the maximum number of vehicles for a given lane as already been reached for a given road region, vehicles may adjust their speed to decrease the number of vehicles within the given road region or modify their lane to accommodate for other vehicles that need to change lanes.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for configuring a plurality of vehicles within a first road region, the plurality of vehicles comprising a computing device configured to communicate with the plurality of vehicles over a network, the computing device comprising a processor, a non-transitory machine-readable storage medium comprising computer-readable instructions that, when executable by the processor, perform steps of:

determining, based on traffic flow parameters for the first road region, vehicle configuration templates corresponding to the plurality of vehicles within the first road region, wherein a vehicle configuration template comprises a set of instructions to control at least one of a desired vehicle dynamic parameter and position parameter of a corresponding vehicle of the plurality of vehicles within the first road region, further wherein the set of instructions for the vehicle configuration templates are chosen to control at least one of position and dynamics of their corresponding vehicles to achieve a desired traffic flow in the first road region; and providing the vehicle configuration templates to their respective vehicles to implement a vehicle transition sequence based on the vehicle configuration templates, wherein the vehicle transition sequence comprises autonomously or semi-autonomously operating one or more of the plurality of vehicles within the first road region to adjust at least one of their respective vehicle positions and dynamics to achieve the desired traffic flow.

2. The system of claim 1, wherein the first road region comprises a road configuration pertaining to at least one of a number of lanes in a road region, a type of lane, and a geometry of the road.

3. The system of claim 1, wherein the vehicle configuration template comprises a first set of configuration parameters pertaining to a first lane, wherein the first set of configuration parameters comprises one or more of:
   a maximum speed;
   a maximum number of vehicles within the first road region; and
   a clearance distance between vehicles within the first road region.

4. The system of claim 3, wherein the vehicle configuration template further comprises a second set of configuration parameters pertaining to a second lane, wherein one or more of the second set of configuration parameters are different from the first set of configuration parameters.

5. The system of claim 1, wherein the plurality of vehicles are configured to communicate to the system one or more of a vehicle position, vehicle dynamics information, and a destination, wherein the destination defines one or more driving maneuvers.

6. The system of claim 5, wherein the vehicle configuration template is based on the destination of one or more vehicles within the first road region.

7. The system of claim 1, wherein the vehicle configuration template is dependent on a time of day.

8. The system of claim 1, wherein the first road region comprises a boundary separating the first road region from a second to road region, and wherein different vehicle configuration templates are determined for the second road region to accommodate conditions in the second road region and to facilitate transition to different vehicle configuration parameters for corresponding vehicles entering the second road region from the first road region.

9. The system of claim 1, further comprising determining a current traffic configuration within the first road region, wherein determining the current traffic configuration within the first road region comprises:
   receiving a first vehicle position and first vehicle dynamic information from vehicles at a first boundary of the first road region;

receiving a second vehicle position and second vehicle dynamic information from the vehicles at a second boundary of the first road region; and determining a traffic configuration based on one or more of:
- a difference between the first vehicle position and the second vehicle position and first vehicle dynamic information and the second vehicle dynamic information received at the second boundary and the first boundary;
- a time it takes for a vehicle to traverse the first road region;
- a number of vehicles that traverse the first road region in a period of time; and
- one or more detected lane changes that occurred within the first road region.

10. The system of claim 1, wherein the instructions, when executable by the processor, further perform the steps of:
generating a traffic configuration modification, wherein a traffic configuration modification comprises a change in vehicle position or vehicle dynamics for one or more vehicles;
queueing one or more traffic configuration modifications; and
implementing the vehicle transition sequence to satisfy the traffic configuration modification at periodic intervals until there are no outstanding queued traffic configuration modifications.

11. The system of claim 10 wherein a traffic configuration modification is generated for vehicles traveling from the first road region in a direction of a second road region, when a road configuration of the first road region is different from a second road region.

12. The system of claim 10, wherein a traffic configuration modification is generated upon receiving a vehicle maneuver request from a vehicle.

13. The system of claim 12, wherein the vehicle maneuver request is received by the vehicle based on a destination of the vehicle.

14. The system of claim 1, wherein the vehicle configuration template is generated by:
monitoring traffic flow pertaining to the first road region;
implementing a mathematical model to correlate monitored vehicle position and vehicle dynamics to the monitored traffic flow;
determining one or more vehicle configuration parameters based on the monitored traffic flow; and
generating the vehicle configuration template based on the determined vehicle configuration parameters.

15. The system of claim 1, wherein the vehicle configuration templates when implemented by the plurality of vehicles cause their respective vehicles to automatically configure themselves to a new vehicle configuration to achieve a desired traffic flow.

16. A method of generating vehicle configuration templates for a plurality of vehicles within a road region, the method comprising:
determining traffic flow parameters based on collected traffic flow data;
correlating vehicle configuration parameters to improved traffic flow parameters;
determining desired vehicle configuration parameters based on correlations between the vehicle configuration parameters and the improved traffic flow parameters;
generating the vehicle configuration templates, the vehicle configuration templates comprising a set of instructions to control at least one of position and dynamics of their corresponding vehicles to achieve improved traffic flow; and
providing the vehicle configuration templates to their respective vehicles to implement a vehicle transition sequence based on the vehicle configuration templates, wherein the vehicle transition sequence comprises autonomously or semi-autonomously operating one or more of the plurality of vehicles to adjust at least one of their respective vehicle positions and dynamics to achieve the improved traffic flow.

17. The method of claim 16, wherein the traffic flow parameters comprise one or more of a flow rate or a traffic density.

18. The method of claim 16, wherein a positional parameter relates to one or more of a vehicle location, a lane in which the vehicle is traveling, or clearing distance between vehicles.

19. The method of claim 16, wherein a dynamic parameter relates to one or more of a vehicle speed, an acceleration, or a vehicle operation.

\* \* \* \* \*